Jan. 27, 1959  W. J. ANDERTON  2,871,041
SHAFT SEAL WITH RELATIVELY ROTATABLE RADIALLY
CONTAINING SEALING SURFACES
Filed May 26, 1955  3 Sheets-Sheet 1

INVENTOR.
WILLIAM J. ANDERTON
BY Hudson, Boughton,
Williams, David & Hoffman
ATTORNEYS Jan. 27, 1959 W. J. ANDERTON 2,871,041
SHAFT SEAL WITH RELATIVELY ROTATABLE RADIALLY
CONTAINING SEALING SURFACES
Filed May 26, 1955 3 Sheets-Sheet 2
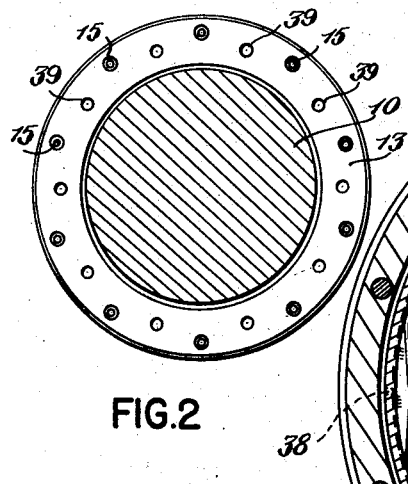
FIG.2
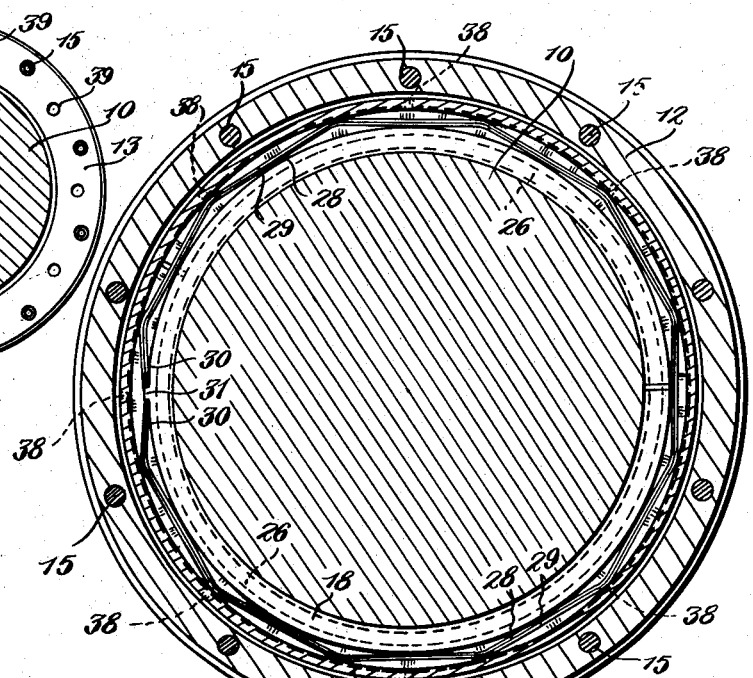
FIG.3
FIG.4
INVENTOR.
WILLIAM J. ANDERTON
BY
ATTORNEYS Jan. 27, 1959 W. J. ANDERTON 2,871,041
SHAFT SEAL WITH RELATIVELY ROTATABLE RADIALLY
CONTAINING SEALING SURFACES
Filed May 26, 1955 3 Sheets-Sheet 3

*INVENTOR.*
WILLIAM J. ANDERTON
BY
ATTORNEYS

United States Patent Office 2,871,041
Patented Jan. 27, 1959

2,871,041

SHAFT SEAL WITH RELATIVELY ROTATABLE RADIALLY CONTAINING SEALING SURFACES

William J. Anderton, Toledo, Ohio

Application May 26, 1955, Serial No. 511,185

11 Claims. (Cl. 286—11.15)

This invention relates to improvements in shaft seals, that is to say means for preventing oil or other liquid from flowing along a rotating shaft through an opening in a housing surrounding the shaft. The seal is particularly effective in high speed high temperature applications such as aircraft engines for preventing the loss of oil from the bearings and stopping air or gases from entering the bearing areas and causing the scavenging of the oil from the bearing, thereby possibly producing bearing failure.

One of the objects of the invention is the provision of a seal of the character stated built entirely of metal.

Another object is the provision of a seal which will not mark or deface the shaft or other surrounding components of the engine adjacent to or engaged by the seal.

Another object is the provision of a seal in which the wear of the relatively revolving parts is reduced to a minimum, which results therefore in a unit of correspondingly long life.

Another object is the provision of a unit in which there is a driving ring gripped tightly upon the shaft, a driven ring spaced from the driving ring by an axially expansible and contractable spring means, which driven ring does not grip the shaft but revolves with it and slides axially under varying pressure conditions, together with slip rings bridging the space between the aforesaid rings and an annular housing channel shaped in cross section in which the rings are enclosed.

Other objects and features of novelty will appear as I proceed with the description of those embodiments of the invention which, for the purposes of the present application, I have illustrated in the accompanying drawings, in which Fig. 1 is a sectional view on a magnified scale of a housing and enclosed parts embodying the invention.

Fig. 2 is a small scale elevational view of the housing surrounding a shaft shown in cross section.

Fig. 3 and 4 are cross-sectional views of the complete unit, the views being taken substantially on the lines 3—3 and 4—4 respectively of Fig. 1;

Figure 1:
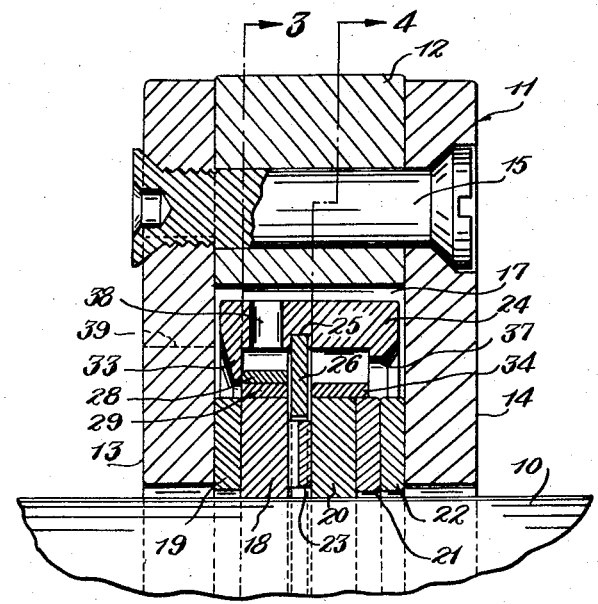

A shaft, such as the main shaft of a high speed airplane engine, is illustrated at 10. Surrounding the shaft but spaced slightly therefrom is an annular housing 11 which is fixed in the engine. This housing comprises a peripheral member 12 and two side walls 13 and 14. When the parts of the unit have been assembled the members of the housing are secured together by screws 15, rivets or other suitable means that are projected through properly aligned holes in the wall 14 and perihperal member 12, the heads of the screws being seated in beveled recesses formed in wall 14. The opposite ends of the screws are threaded into threaded holes in wall 13, after which they may be peened over to prevent loosening.

The channel shape of the housing 11 provides an annular chamber 17 within the housing, open toward the shaft. Within this chamber there is a sealing ring 18 which is formed preferably of iron of the type used for piston rings. Ring 18 is a split ring that grips the shaft securely, being compressed for that purpose by spring means presently to be described. Between ring 18 and the wall 13 of the housing there is a slip ring 19 with an internal periphery slightly greater than the periphery of the shaft 10. This slip ring may be formed of a suitable low friction material preferably of a porous nature made from powdered metal containing bronze, graphite, iron, etc. The ring therefore absorbs a lubricant and has good frictional characteristics. Being disposed between the stationary wall 13 and the ring 18 turning at shaft speed and being in frictional contact with both of these members, ring 19 normally revolves at about one-half shaft speed.

Ring 20 also turns at the same angular speed as shaft 10 but does not grip the shaft. It is a continuous ring rather than a split ring and is made with an internal diameter such that it may be slid onto the shaft with very light or no pressure. It is formed preferably of a low friction material having a controlled coefficient of expansion similar to that of the shaft so that the clearance between it and the shaft is maintained constant during various temperatures encountered. Ring 20 is driven from ring 18 through the intermediacy of other revolving parts, as will presently appear, and is therefore termed herein the "driven" ring.

Interposed between ring 20 and side wall 14 of the housing there is slip ring means which, in the illustrated form, comprises a steel ring 21 and a bronze ring 22. The frictional characteristics as between rings 20 and 21, rings 21 and 22, and between ring 22 and the steel wall 14 of the housing are therefore good. The inner peripheries of the rings 21 and 22 are such as to clear the shaft. Where two slip rings are used, ring 21 will revolve at about two-thirds of the speed of ring 20 and ring 22 at about one-third of that speed.

A spring spacer ring 23 is interposed between driving and driven rings 18 and 20. Ring 23 is a wavy ring of spring steel, that is formed with radial crimps throughout its extent so as to bear alternately upon the inner faces of the two rings 18 and 20. It may yield under stress sufficiently to permit ring 20 to slide toward ring 18 a small increment, and when such stress is relieved at times to slide ring 20 away from ring 18, and it assists at all times in maintaining the necessary frictional contact between adjacent rings and between the outer slip rings 19 and 22 and the walls of the housing.

All of the rings thus far described are surrounded by a solid or continuous shroud ring 24 which is of somewhat less width than the width of chamber 17 and is designed to turn within that chamber without contact with the side walls 13 and 14 of the housing. It is provided with an internal annular groove 25 in which is seated a snap ring 26. The latter ring may be constructed integral with ring 24, if desired. The ring 26 extends inwardly into the space between the rings 18 and 20. Strong annular spring means is provided between the shroud ring 24 and the drivinig ring 18, this means bearing inwardly on the ring 18 and outwardly on the internal wall of the shroud ring 24. The force of this spring means is strong enough to contract the split ring 18 and cause it to exert a firm grip on the shaft 10, so that when the shaft turns ring 18 must turn with it at the same angular speed.

As shown in the drawing, see particularly Fig. 3, this spring means comprises superposed springs 28 and 29 (one or more as necessary) formed to bear alternately at rather closely spaced intervals upon the rings 18 and 24. Ring 18 may have a pair of flats 30 which are separated far enough to provide a projection 31 against which ends of spring leaves 28 and 29 seat. Because of the pressure exerted by the spring leaves 28 and 29 against the shroud ring 24, that ring revolves with the ring 18 at shaft speed.

Spring rings 28 and 29 bear laterally on one side against snap ring 26 and at the other side against an inwardly directed annular projection 33. Driven ring 20 is surrounded by spring ring means 34 of a single thickness divided at diametrically opposite points into two pieces. At one end each ring half bears against a projection 35 on ring 20 and at its opposite end against a projection 36 on the shroud ring 24.

Ring 20, being continuous, cannot be contracted by the spring means 34. It is however driven or revolved by this spring means because of the engagement of the latter with the projection 35. Ring 20 turns accordingly at the same speed as shroud ring 24 and thus at the same speed as the shaft, but because of the light frictional pressure exerted on it by spring means 34 the free axial movement of this member is not inhibited.

Shroud ring 24 has a shallow inwardly extending projection 37 spaced far enough from snap ring 26 to accommodate a spring means 34 of sufficient width to overlap slip ring 21, which is particularly advantageous because it centers the slip ring 21 which is formed of steel and would scuff the shaft if it were not held thus in spaced relation with the shaft.

Shroud ring 24 has a series of spaced radial ports 38 which permit oil or other liquid to flow freely outward into chamber 17 because of centrifugal force. It may then pass laterally from chamber 17 through ports 39 in side wall 13 back into the engine or other compartment holding oil. Thus during the operation of the engine oil may circulate freely along the shaft to the seal, outwardly through ports 38, laterally through ports 39 and back to the shaft.

Figure 5:
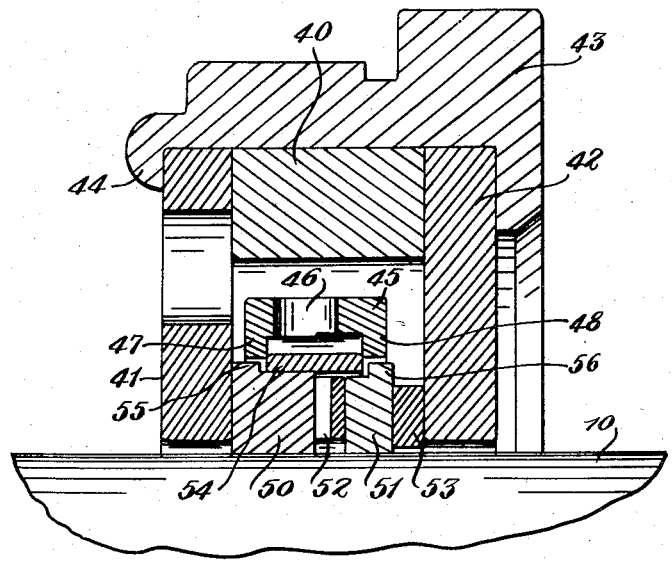
Fig. 5 is a large scale sectional view coresponding to Fig. 1 of a modified form of the invention.

The form of the invention illustrated in Fig. 5 is similar in principle to that of Fig. 1. It is intended primarily for seals of smaller diameter. The housing comprises a peripheral member 40 and side wall members 41 and 42. The device may be assembled and set laterally into a fixed enclosure 43, after which an annular part 44 may be spun over to lock the housing parts together permanently. The shroud ring 45 has radial ports 46 corresponding in function with the ports 38 of the first described form. Shroud ring 45 also has inwardly extending annular projections 47 and 48 corresponding in function with the projections 33 and 37 of the first described form.

There is a driving ring 50 and a driven ring 51 having functions similar to those of rings 18 and 20 and a wavy resilient spacing ring 52 similar to the ring 23. In this case driving ring 50 is a split ring formed of good bearing metal, wavy ring 52 is of spring material, driven ring 51 is of piston ring iron and slip ring 53 is of a good bearing metal. Spring ring 54 performs the functions of the three rings 28, 29 and 34 of the first described form of the invention, that is to say it serves to contract the driving ring 50 and cause it to tightly grip the shaft 10 and also it engages a projection, not shown, on driven ring 51 corresponding in function to the projection 35 on the ring 20 of Fig. 4. On rings 50 and 51 there are outwardly extending projections 55 and 56 which hold the ring 54 from axial travel and thus cooperate with the projections 47 and 48 to hold the shroud ring 45 from lateral travel into contact with a side wall of the housing.

Figure 6:
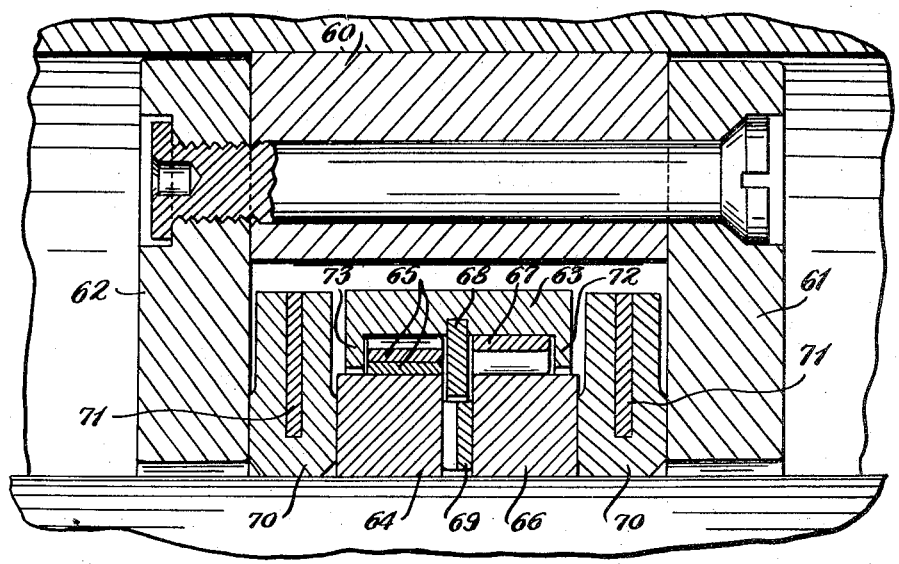
Fig. 6 is a large scale cross-sectional view similar to Fig. 1 but showing a somewhat different seal.

In that form of the invention illustrated in Fig. 6 the annular housing comprises peripheral member 60 and side wall members 61 and 62. 63 is a shroud ring having functions similar to those of ring 24 of the Fig. 1 form. Within ring 63 there is a split ring 64 that grips the shaft under the pressure exerted by one or more spring expander rings 65 working against the shroud ring. Axially separated from ring 64 there is a continuous ring 66 which has an internal diameter such that it may be slid onto the shaft with very little pressure, and like ring 20 it is formed preferably of a low friction material having a controlled coefficient of expansion similar to that of the shaft, so that the clearance between it and the shaft is maintained constant regardless of the temperature encountered.

Ring 66 is driven from ring 63 through the intermediacy of spring ring 67 which resembles ring 34 of the first described form both in shape and function, being preferably formed in two 180° sections, the ends of which engage projections 180° apart on the rings 63 and 66 in a manner similar to the engagement of the ring sections 34 with the projections 35 and 36 of Fig. 4. The bearing of spring ring 67 upon driven ring 66 is relatively light so that it offers no substantial impediment to the axial movement of ring 66.

A snap ring 68 is set into an internal groove in ring 63, separating the spring rings 65 from the spring ring 67, and a wavy spring ring 69 similar to ring 23 separates the rings 64 and 66 and tends to move them axially away from each other. Ring 64, being gripped to the shaft, is a driving ring and ring 66 is the driven ring. Flanges 72 and 73 on shroud ring 63 assist snap ring 68 in restraining the spring expander rings 65 and the spring ring 67 from axial movement.

In this form of the invention there are two slip rings 70, which may be identical. These slip rings are interposed between the rings 64 and 66, which revolve at shaft speed, and the stationary walls 61 and 62 of the housing. The rings 70, being pressed apart axially in a frictional engagement with the walls 61 and 62 by the wavy ring 69, revolve at speeds about half that of the shaft. These rings 70 may be similar to rings 19 and 22 of the first described form, but preferably are of special form and material comprising endless washers 71 of steel covered with sintered powdered metal of porous low friction characteristics, bronze for example, firmly united to the washer under heat and pressure.

The functioning of the Fig. 6 seal is very much like that of the Fig. 1 form, and needs no separate description.

Figure 7:
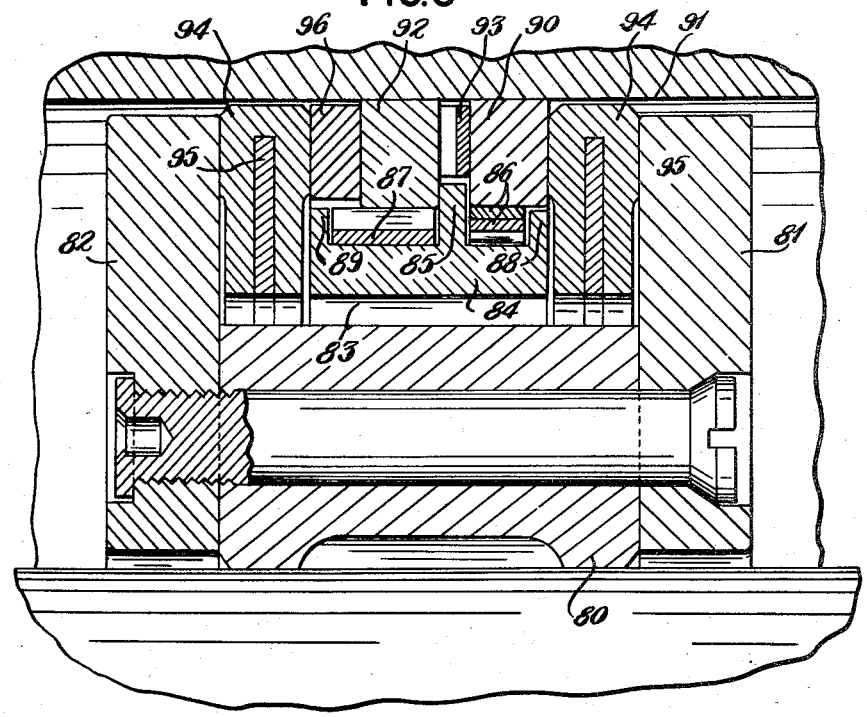
Fig. 7 is a cross-sectional view also on a magnified scale wherein the seal is against the housing rather than against the shaft.

Referring now to Fig. 7 of the drawing, there is here illustrated what may be termed an expanding seal, as distinguished from the contracting seals of the previously described forms. In Fig. 7 there is an annular housing of channel shape cross-section open toward its periphery. This housing may include a solid ring member 80 and radial wall members 81 and 82 suitably secured to ring 80. The ring member 80 has one or more internal surfaces dimensioned to fit the shaft so closely that it must be forced into position under considerable pressure. The housing therefore revolves at all times at the same angular speed as the shaft.

The ring elements of the seal, part of which do not turn, and part of which turn at an angular speed less than that of the shaft, are disposed within an annular chamber 83 resulting from the channel shape cross-sectional form of the housing. A solid continuous ring 84, termed a shroud ring because of its similarity in function with the shroud rings previously described, is disposed within the chamber 83 in spaced relation to the member 80 of the housing. Shroud ring 84 includes an integral intermediate wall 85 having a function similar to that of the snap rings 26 and 68 previously described, that is it works in conjunction with side flanges 88 and 89 on ring 84 to retain and guide the expander rings 86 and the spring ring 87.

The ring 90 against which the expander rings 86 bear is a split ring that is forced into tight engagement with the stationary enclosing cylindrical wall 91 spaced from the shaft. It may be formed of cast iron. An endless washer 92 on the opposite side of the intermediate wall 85 is contacted by the single spring ring 87 which causes it to bear with relatively light pressure against the cylindrical wall 91. It has about the same coefficient of expansion as wall 91, and is so dimensioned as to be susceptible of slight axial movement as the wavy ring 93 expands and contracts in the operation of the seal.

Bearing against the side walls 81 and 82 of the housing are a pair of slip rings 94 which, like the rings 70 may be formed of endless steel inserts 95 covered with sintered metal of low friction characteristics. If desired a further slip ring 96 may be used between ring 92 and one of the rings 94.

Rings 90 and 92 bear some resemblance in function to the rings 18 and 20 and to the rings 64 and 66 of the previously described forms, which rings have been termed herein "driving" and "driven" rings. The latter terms do not strictly apply to the rings 90 and 92 because those rings do not turn. They do however have relative axial movement as do the said driving and driven rings.

Having thus described my invention, I claim:

1. In combination, a rotating shaft member, an enclosing stationary cylindrical wall member spaced from the shaft member, an annular oil seal interposed between said shaft and enclosing wall members, said seal comprising an annular housing of channel shape cross-section tightly fitting one of said members, the chamber enclosed by the channel facing the other member, a shroud ring in said chamber, a split ring in said chamber disposed between said shroud ring and said other member, spring means bearing against said shroud ring and forcing said split ring into gripping relation with said other member, a continuous ring engaging said other member and spaced axially from said split ring by a wavy axially expansible ring, spring means bearing on said shroud ring and on said continuous ring on the side thereof remote from said other member, and means for holding said last named spring means against axial movement while permitting axial movement of said continuous ring, whereby relative axial movement between said split ring and said continuous ring is permitted.

2. A shaft seal substantially as defined in claim 1, comprising a slip ring between said continuous ring and said annular housing.

3. A shaft seal substantially as defined in claim 1, comprising slip rings between each of said split and continuous rings and a radial wall of said annular housing.

4. In a seal for a rapidly rotating shaft, a fixed annular housing of channel shape cross-section surrounding the shaft and presenting an annular chamber open toward the shaft, a solid shroud ring in said chamber spaced from the shaft, said shroud ring having an internal annular groove, a snap ring in said groove, a split metal driving ring on one side of said snap ring, annular spring means interposed between said driving ring and said shroud ring exerting strong radial pressure inwardly and outwardly, whereby said driving ring grips the shaft and whereby said shroud ring is rotated at the same angular speed as the shaft, a driven ring surrounding the shaft on the opposite side of said snap ring, an axially expansible spacer between said driving and driven rings, and means between said shroud ring and said driven ring for revolving said driven ring at the same angular speed as the shroud ring.

5. In a seal for a rotating shaft, a fixed annular housing of channel shape cross-section surrounding the shaft and presenting an annular chamber open toward the shaft, a split driving ring closely surrounding the shaft within said chamber, a driven ring surrounding the shaft within the chamber spaced from said driving ring by an axially expansible spring ring, a continuous shroud ring in said chamber of less width than the chamber surrounding said driving and driven rings, annular spring means bearing outwardly on said shroud ring and inwardly on said driving and driven rings, said annular spring means holding said driving ring in gripping relation with the shaft and transmitting revolving motion to said driven ring, said driven ring being a continuous ring closely fitting the shaft when the parts are cool, and having approximately the same coefficient of expansion as the shaft, whereby it is axially slidable upon the shaft under different temperature conditions.

6. A shaft seal substantially as defined in claim 4, comprising at least one slip ring between said housing and the driven ring revolved by friction from the driven ring.

7. A shaft seal substantially as defined in claim 4, wherein there is at least one slip ring between said housing and each of said driving and driven rings revolved by friction from said driving and driven rings.

8. A shaft seal substantially as defined in claim 4, wherein there are two slip rings between the driven ring and the adjacent side walls of the housing, the inner of said slip rings having a substantially larger inner diameter than the diameter of the shaft and being formed of steel, and the said means for revolving the driven ring from the shroud ring comprising annular spring means interposed between the shroud ring and the driven ring, said spring means being of a width sufficient to overlap said steel slip ring and center the latter so that contact with the shaft is avoided.

9. In a seal for a rotating shaft, a fixed annular housing of channel shape cross-section surrounding the shaft and presenting an annular chamber open toward the shaft, a split driving ring closely surrounding the shaft within said chamber, a driven ring surrounding the shaft within the chamber spaced from said driving ring by an axially expansible spring ring, a continuous shroud ring in said chamber of less width than the chamber surrounding said driving and driven rings, annular spring means bearing outwardly on said shroud ring and inwardly on said driving and driven rings, said annular spring means holding said driving ring in gripping relation with the shaft and transmitting revolving motion to said driven ring, said means between the shroud ring and said driven ring for revolving and driven ring comprises two radially expansible spring halves, an end of each engaging the shroud ring at approximately the same point, the opposite ends of said ring halves engaging the driven ring diametrically opposite their points of engagement with the shroud ring, whereby said ring halves communicate rotation to said driven ring in either direction depending upon the direction of rotation of the shroud ring.

10. In a seal for a rapidly rotating shaft, a fixed annular housing of channel shape cross-section surrounding the shaft and presenting an annular chamber open toward the shaft, a solid shroud ring in said chamber spaced from the shaft, said shroud ring having an internal annular groove, a snap ring in said groove, a split metal driving ring on one side of said snap ring, annular spring means interposed between said driving ring and said shroud ring exerting strong radial pressure inwardly and outwardly, whereby said driving ring grips the shaft and whereby said shroud ring is rotated at the same angular speed as the shaft, a driven ring surrounding the shaft on the opposite side of said snap ring, an axially expansible spacer between said driving and driven rings, and means between said shroud ring and said driven ring for revolving said driven ring at the same angular speed as the shroud ring, said shroud ring being of less width than the annular chamber and wherein said snap ring extends inwardly into the space between said driving ring and said driven ring, thereby holding said shroud ring axially spaced from the side walls of said annular housing.

11. In a seal for a rotating shaft, a fixed annular housing of channel shape cross-section surrounding the shaft and presenting an annular chamber open toward the shaft, a split driving ring closely surrounding the shaft within said chamber, a driven ring surrounding the shaft within the chamber spaced from said driving ring by an axially expansible spring, a continuous shroud ring in said chamber of less width than the chamber surrounding said driving and driven rings, said shroud ring carrying inwardly projecting annular projections and each of said driving and driven rings carrying an outwardly projecting annular portion facing one of said inwardly projecting annular portions of said shroud ring, annular spring means bearing outwardly on said shroud ring between its annular projections and inwardly on said driving and driven rings between the respective projections thereof, whereby the shroud ring is held from axial movement relative to the driving and driven rings, said annular spring means holding said driving ring in gripping relation with the shaft and transmitting revolving motion to said driven ring, the projections on the driving and driven rings being proportioned to hold the shroud ring spaced from the side walls of the housing.

References Cited in the file of this patent

UNITED STATES PATENTS

| | | |
|---|---|---|
| 1,975,170 | Olson | Oct. 2, 1934 |
| 1,988,966 | Eckhouse | Jan. 22, 1935 |
| 2,299,813 | Franks | Oct. 27, 1942 |
| 2,433,839 | Ferguson et al. | Jan. 16, 1948 |
| 2,571,868 | Haller | Oct. 16, 1951 |
| 2,639,171 | Johnson | May 19, 1953 |